United States Patent

[11] 3,575,660

[72] Inventor Otto A. Jorgensen
Centerport, N.Y.
[21] Appl. No. 764,798
[22] Filed Oct. 3, 1968
[45] Patented Apr. 20, 1971
[73] Assignee Hazeltine Corporation

[54] ELECTRONIC IMAGE REJECTION APPARATUS
4 Claims, 9 Drawing Figs.

[52] U.S. Cl. 325/388, 325/437
[51] Int. Cl. H04b 1/18
[50] Field of Search 325/367, 369, 371, 376, 378, 385, 387, 435, 440; 343/6.5; 325/388, 437

[56] References Cited
UNITED STATES PATENTS

| | | | |
|---|---|---|---|
| 2,044,745 | 6/1936 | Hansell | 325/437 |
| 3,460,139 | 8/1969 | Rittenbach | 343/6.5 |

*Primary Examiner*—Robert L. Griffin
*Assistant Examiner*—Albert J. Mayer
*Attorney*—Kenneth P. Robinson

ABSTRACT: Disclosed is electronic image rejection apparatus which provides relatively uniform image rejection performance over a band of input frequencies and a range of operating temperatures without supplemental frequency or temperature compensation. The apparatus accepts an L.O. signal and an input RF signal containing both desired and image frequency components, and processes the signals in two parallel signal conversion channels to develop a resultant output IF signal which contains substantially only frequency components corresponding to the desired components of the input RF signal. In the parallel channels conversion of the input RF signal to IF takes place together with the introduction of equal but opposite phase shifts. The phase-shifted IF signal in each channel is then further phase shifted an amount equal in magnitude to that introduced in the RF to IF conversion process, and the resulting two IF signals then combined to develop the aforementioned resultant output IF signal. Other embodiments are covered.

ELECTRONIC IMAGE REJECTION APPARATUS

The present invention relates to electronic image rejection apparatus for use in equipment which utilizes the heterodyne principle.

Prior art electronic image rejection techniques generally have employed complex filter circuits interposed between the antenna and the mixer stage of a superheterodyne receiver, for example. These filter circuits are intended to transmit the desired frequency components of the received signal to the mixer while at the same time substantially attenuating the undesired image frequency components, which, as is well known, are separated from the local oscillator frequency by the intermediate frequency, and separated from the desired frequency components by twice the intermediate frequency. However, filter circuits of this type have proven to be inefficient, troublesome, limited in bandwidth and suffer other disadvantages and limitations.

Another prior art electronic image rejection technique is that described by M. Loss in the July 12, 1965 issue of ELECTRONICS Magazine. Generally, this latter technique involves division of an input radio frequency (RF) signal, containing desired signal components and undesired image components into two equal RF signals, one of which is then retarded in phase by 90° with respect to the other. The resulting quadrature RF signals are separately down-converted to a common intermediate frequency (TF) band, and the two IF signals combined in a sum and difference network to develop at one output, a first IF signal wherein the undesired image components are attenuated in relation to the desired signal components, and to develop at a second output, a second IF signal wherein the desired signal components are attenuated in relation to the undesired image components. However, this image rejection technique suffers from several inherent disadvantages and limitations resulting from the intentional introduction of a phase shift in only one of the two parallel RF to IF signal conversion paths, and from the substantial nature of the phase shift required (−90°) from the phase-shifting circuitry. These requirements are particularly troublesome where the image rejection circuitry is required to provide relatively uniform operation with input RF signals extending over a wide band, or under operating temperatures subject to variation over a wide temperature range. Phase-shifting circuitry capable of providing the 90° shifts necessary with the aforementioned technique while at the same time being relatively wide band and/or temperature stable, would be difficult and expensive to implement, thereby rendering the above image rejection technique disadvantageous and limited in its applications.

It is therefore an object of the present invention to provide new and improved electronic image rejection circuitry which is particularly simple, inexpensive, capable of relatively wide-band operation, and inherently temperature stable.

In accordance with the present invention there is provided electronic image rejection apparatus usable to provide relatively uniform image rejection performance over a band of input frequencies and a range of operating temperatures without supplemental frequency or temperature compensation comprises means for supplying an input signal having desired components in a first frequency band and which may have undesired image components in the frequency band and means for supplying a reference signal of predetermined frequency. The apparatus further comprises first signal translating means, responsive jointly to the input and reference signals, for developing a first signal having desired and image components corresponding to like components of the input signal, in a second frequency band with the desired components of the first signal exhibiting a phase shift which is substantially equal and opposite to a phase shift exhibited by the image components of the first signal and second signal translating means, responsive jointly to the input and reference signals, for developing a second signal having desired and image components, corresponding to like components of the input signal, in the second frequency band with the desired components of the second signal exhibiting a phase shift which is substantially equal and opposite both to a phase shift exhibited by the image components of the second signal and to the phase shift exhibited by the desired components of the first signal. The apparatus also includes means for phase shifting the first and second signals by substantially equal and opposite amounts and means for combining the phase-shifted first and second signals to develop a resultant output signal, wherein the desired components of the phase-shifted first and second signals are additively combined to develop corresponding desired components in the resultant output signal and wherein the image components of the phase-shifted first and second signals are subtractively combined with substantial cancelling effects to develop substantially no corresponding image components in the resultant output signal whereby different input frequencies and different operating temperatures have complementary effects on the first and second signal translating means and the phase-shifting means, thereby permitting the image rejection performance of the apparatus to remain relatively uniform over the band of input frequencies and the range of operating temperatures.

For a better understanding of the present invention together with other and further objects thereof, reference is had to the following description taken in connection with the accompanying drawing, and its scope will be pointed out in the appended claims.

Referring to the drawing.

Figure 1:
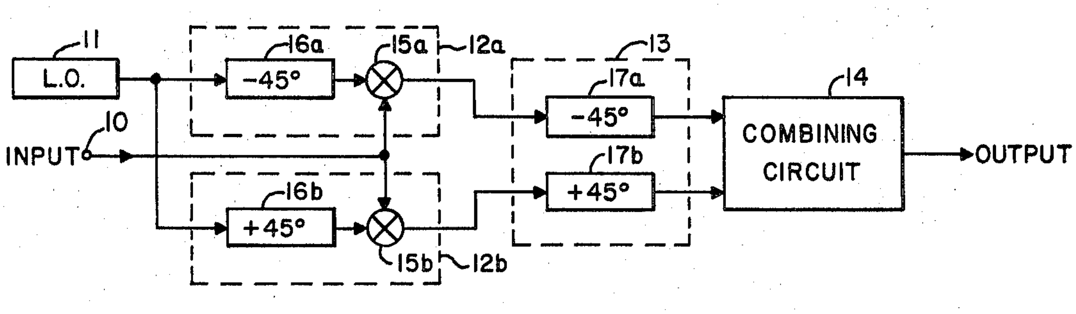
FIG. 1 is a block diagram, partly schematic, of electronic image rejection apparatus which embodies the invention in one form.

FIGS. 3*a*, 3*b*, 4*a*, 4*b* and 5 are signal phase diagrams useful in describing the operation of the apparatus of FIGS. 1 and 2, and FIGS. 6 and 7 are schematic diagrams of circuits useful in performing the combining function of unit 14 of FIG. 1.

DESCRIPTION OF THE APPARATUS OF FIG. 1

In FIG. 1 of the drawing there is shown a typical embodiment of electronic image rejection apparatus constructed in accordance with the present invention. The apparatus of FIG. 1 includes an input terminal 10 for supplying an input signal having desired frequency components in a first frequency band and which may have undesired image frequency components in the first frequency band. For purposes of illustration and to simplify the description of the FIG. 1 apparatus, it will be assumed that input terminal 10 supplies an input signal lying in a selected radio frequency (RF) band and having single frequency desired and image components of the general form:

$$\text{Input}_{10}=BA_1 \sin \omega_s t+A_2 \sin \omega_i t \qquad (1)$$

where $\omega_s$ represents the desired signal frequency component and wherein $\omega_i$ represents the undesired image frequency component of the input signal.

In addition, a conventional local oscillator (*L.O.*) 11 supplies a reference frequency signal of the form:

$$\text{Input}_{L.O.}=B \sin \omega_L t \qquad (2)$$

In the embodiment of FIG. 1 it will be assumed that the following relationships exist between the *L.O.* frequency, and the desired and image frequency components:

$$\omega_i>\omega_L>_s \qquad (3)$$

$$(\omega_L-\omega_s)=(\omega_i-\omega_L) \qquad (4)$$

Included in the apparatus of FIG. 1 is a first signal translating means, in this case the components within dotted box 12*a*, responsive jointly to the input and reference signals for developing a first signal having desired and image components, corresponding to like components of the input signal, in a second frequency band, the desired components of the first signal exhibiting a phase shift which is substantially equal and opposite to a phase shift exhibited by the image components of the first signal.

Figure 3A:
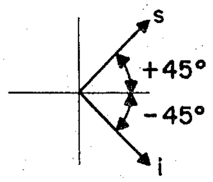

In the embodiment of FIG. 1 first signal translating means 12a includes a first phase-shifting circuit 16a for introducing a −45° phase shift to the supplied *L.O.*signal, and a suitable first mixer 15a, of either the single or balanced type, for mixing the phase-shifted *L.O.* signal and the supplied input signal from terminal 10 to develop a first signal lying in an intermediate frequency (IF) band, and of the form:

$$\text{Output}_{12a}=K_{1a}\cos[(\omega_L-\omega_s)t+45°A]+K_{2a}\cos[(\omega_i-\omega_L)t-45°A] \quad (5)$$

where the $(\omega_L-\omega_s)$ term represents the desired IF component of the first signal and the $(\omega_i-\omega_L)$ term represents the image IF component of the first signal developed at the output of first signal translating means 12In the above equation it will be seen that the −45° phase shift introduced into the supplied *L.O.* signal by phase-shifting circuit 16a is converted via mixer 15a to +45° phase shift of the desired component of the first signal and a −45° phase shift of the image component of the first signal, as shown in FIG. 3a.

The apparatus of FIG. 1 also includes a second signal translating means, in this case the components located within dotted box 12b, responsive jointly to the input and reference signals, for developing a second signal having desired and image components, corresponding to like components of the input signal, in the second frequency band, the desired components of the second signal exhibiting a phase shift which is substantially equal and opposite both to a phase shift exhibited by the image components of the second signal and to the phase shift exhibited by the desired components of the first signal.

Figure 3B:
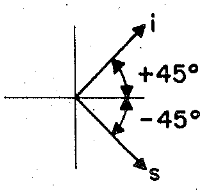

As shown in FIG. 1, second signal translating means 12b includes a second phase-shifting circuit 16b for introducing a +45° phase shift into the supplied *L.O.* signal. Also included in the second signal translating means 12b is a suitable second mixer 15b for mixing the phase-shifted *L.O.* signal and the input signal from terminal 10 to develop a second signal lying in the aforementioned IF band and of the form:

$$\text{Output}_{12b}=K_{1b}\cos[(\omega_L-\omega_s)t-45°A]+K_{2b}\cos[(\omega_i-\omega_L)t+45°A] \quad (6)$$

where the $(\omega_L-\omega_s)$ term represents the desired If component of the second signal and the $(\omega_i-\omega_L)$ term represents the image IF component of the second signal developed at the output of second signal translating means 12b. In the above equation it will be seen that the +45° phase shift introduced into the supplied *L.O.* signal by phase-shifting circuit 16a is converted via mixer 15a to a −45° phase shift of the desired component of the second signal and a +45° phase shift of the image component of the second signal, as shown in FIG. 3b.

Also included in the apparatus of FIG. 1, is a means, which in this case includes the components within dotted box 13, for phase shifting the first and second signals by substantially equal and opposite amounts. In the particular embodiment of FIG. 1, phase-shifting means 13 includes a third phase-shifting circuit 17a for phase shifting the first signal from first signal translating means 12a by −45°, and further includes a fourth phase-shifting circuit 17b for phase shifting the second signal from second signal translating means 12b by +45°. As a result of the aforementioned phase shifts introduced by phase-shifting circuits 17a and 17b, the phase-shifted first signal appearing at the output of phase shifter 17a is of the form:

$$\text{Output}_{17a}=K_{1a}\cos(\omega_L-\omega_s)t+K_{2a}\cos[(\omega_i-\omega_L)t-90°A] \quad (7)$$

and similarly the phase-shifted second signal appearing at the output of phase-shifting circuit 17b is of the form:

$$\text{Output}_{17b}=K_{1b}\cos(\omega_L-\omega_s)t+K_{2b}\cos[(\omega_i-\omega_L)t+90°A] \quad (8)$$

Figure 4A:
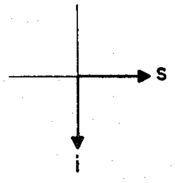
Figure 4B:
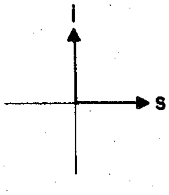

From equations (7) and (8) it will be appreciated that the desired signal components of the phase-shifted first and second signals are in phase, while the image components of the phase-shifted first and second signals are 180° out of phase as shown in FIGS. 4a and 4b.

There is finally included in the apparatus of FIG. 1 means, shown as combining circuit 14, for combining the phase-shifted first and second signals to develop a resultant output signal, and wherein the desired components of the phase-shifted first and second signals additively combine to develop corresponding desired components in the resultant output signal and wherein the image components of the phase-shifted first and second signals subtractively combine with substantial cancelling effects to develop substantially no corresponding image components in the resultant output signal.

Figure 5:
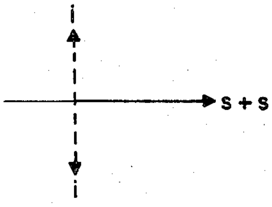
Figure 6:
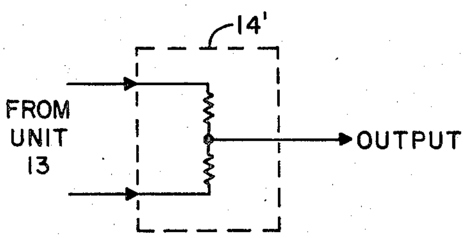
Figure 7:
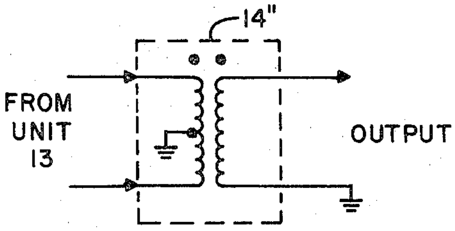

In the particular embodiment of FIG. 1, since, as was mentioned hereinabove, the signal components of the phase-shifted first and second signals are in phase and the image components of the phase-shifted first and second signals are 180° out of phase, therefore, the combining circuit 14 in this case may take the form of a simple linear adder, such as the conventional resistive adder shown in FIG. 6 of the drawings, for example. Assuming this to be the case, then the resultant signal developed at the output of combining circuit 14 will be an IF signal of the form:

$$\text{Output}_{14}=(K_{1a}+K_{1b})[\cos(\omega_L-_s)t] \quad (9)$$

which contains only the desired component as shown in FIG. 5, and which may then be coupled to further signal processing circuitry such as a demodulator, for example, where the resultant IF signal can be modulated, free from adverse effects that would otherwise be introduced if the IF signal were to contain image components of any substantial amplitude.

While in the embodiment of FIG. 1 the arrangement is such that the phase-shifting circuits 16a and 16b introduce phase shifts to the supplied *L.O.* reference signal, it will be appreciated by those skilled in the art that identical results over a wider band of input signal frequencies can be achieved by introducing these phase shifts to the supplied input signal from terminal 10 instead of the *L.O.* signal. This alternate arrangement is used in the embodiment of FIG. 2 which will be described in more detail hereinafter. However, it will be noted that the embodiment of FIG. 1 offers a particular advantage where the input signal supplied from terminal 10 is relatively weak and suffers from a poor signal-to-noise ratio, in that the weak signal would be supplied directly to the mixers 15a and 15b, whereas in the alternate embodiment of FIG. 2 the weak input signal would be undesirably attenuated further due to the presence of phase-shifting circuits 16a and 16b in the signal paths to mixers 15a and 15b, respectively.

In light of the foregoing description of the electronic image rejection apparatus of FIG. 1, its operation will be apparent to those skilled in the art. Briefly, as an input RF signal containing both desired and image frequency components is supplied to input terminal 10 from the antenna and RF amplifier of a superheterodyne radio receiver, for example, the input signal is coupled directly to an input of each of the two mixers 15a and 15b. Simultaneously a reference *L.O.* frequency, suitable for heterodyning with the RF desired and image components of the input signal in order to develop corresponding IF components, is generated by the *L.O.*11, phase shifted by −45° in phase shifter 16b,and the phase-shifted *L.O.* signals coupled to other inputs of the mixers 15a and 15b, respectively. The first and second IF signals developed by mixers 15a and 15b, respectively, are of the form shown in equations (5) and (6) above, wherein the desired component in each case appears phase shifted by an amount (−45° and +45°, respectively) which is equal and opposite to the phase shift exhibited by the corresponding image component (+45° and −45°, respectively).

The first and second signals are then phase shifted by −45° and +45° respectively in the phase shifters 17*a* and 17*b*, as a result of which the desired components of the phase-shifted first and second signals are brought into phase, while the image components are further separated in phase to 180° with respect to one another as shown in equations (7) and (8). Thus, simple linear addition of the phase-shifted first and second signals results in the desired components adding and the image components subtracting, or cancelling, to produce a resultant IF signal which contains only a desired component and substantially no image component.

It should be noted that in achieving the above described operation, a phase shift of only +45° or −45° is necessary from the phase-shifting circuits 16*a*, 16*b*, 17*a* and 17*b*. This is an especially advantageous feature of the invention in that, (A) phase shifts of either ±45° can be easily obtained by using simple R-C circuits such as those shown in the FIG. 2 embodiment, and (B) it is considerably simpler and easier to construct relatively wide-band 45° phase-shifting circuits than it is to construct wide-band circuits which are capable of providing the 90° phase shifts required in prior art electronic image rejection schemes.

In addition, the symmetrical nature of electronic image rejection apparatus constructed in accordance with the present invention offers significant benefits in that the effects of changes in *L.O.* frequency, signal frequency components, image frequency components or ambient temperature tend to be of a complementary nature in the two parallel signal translating channels so that overall phase relationships between and within the two channels remain relatively constant. This is clearly illustrated in the embodiment of FIG. 1 where, if it is assumed, for example, that phase-shifting circuits 16*a*, 16*b*, 17*a* and 17*b* are of the R-C type shown in FIG. 2, it can be seen that an increase in *L.O.* frequency will, for example, cause the phase shift introduced by the circuit pair 16*a* and 16*b* to change in a complementary manner; that is, circuit 16*a* will introduce a greater phase shift while circuit 16*b* introduces a lesser phase shift to the higher frequency *L.O.* signal. However, it will be appreciated that this complementary change in the phase shift introduced by circuits 16*a* and 16*b* has little effect on the relative phase difference between the two phase-shifted *L.O.* signals appearing at their outputs, which will remain at substantially 90°. The same is true for the pair of phase-shifting circuits 17*a* and 17*b*. Furthermore, changes in operating temperature are also compensated for in the same manner in that an increase in temperature will produce similar complementary changes in the phase shifts introduced by the circuit pair 16*a* and 16*b*, and the pair 17*a* and 17*b*. Thus, electronic image rejection apparatus constructed in accordance with the present invention will exhibit an inherent temperature stability and the capability of automatically tracking input frequency changes so as to insure a relatively uniform image rejection performance over a band of input frequencies and a range of operating temperatures without supplemental frequency of or temperature compensation.

In the above description of the embodiment of FIG. 1, it was initially assumed that the desired frequency component ($\omega_s$) of the input signal from terminal 10, was lower in frequency than the supplied *L.O.* frequency ($\omega_L$), and that the image frequency component ($\omega_i$) lay above the *L.O.* frequency. It is, of course, possible for the inverse to be true; that is, that the relations between the *L.O.* frequency, and the desired and image frequency components may be:

$$\omega_s>\omega_L>_i \qquad (10)$$

Should this be the case, the apparatus of FIG. 1 would operate in the same manner as has already been described above, except that the first and second signals developed at the outputs of first and second signal translating means 12*a* and 12*b* respectively, would be of the form:

$$\text{Output}_{12a}=K_{1a}\cos[\omega_s-\omega_L)t-45°A]+K_{2a}\cos[\omega_L-\omega_i)t+45°A] \qquad (11)$$

$$\text{Output}_{12b}=K_{1b}\cos[\omega_s-\omega_L)t+45°A]=K_{2b}\cos[\omega_L-_i)t-45°] \qquad (12)$$

while the phase-shifted first and second signals appearing at the outputs of phase-shifting circuits 17*a* and 17*b* respectively, would be of the form:

$$\text{Output}_{17a}=K_{1a}\cos[\omega_s-\omega_L)t-90°A]+K_{2a}\cos(\omega_L-\omega_i)t \qquad (13)$$

$$\text{Output}_{17b}=K_{1b}\cos[\omega_s-\omega_L)t+90°A]+K_{2b}\cos(\omega_L-\omega_i)t \qquad (14)$$

From equations (13) and (14) it can be seen that in this case the desired signal components of the phase-shifted first and second signals will be 180° out of phase, while the image components of these two signals will be in phase. Therefore, signal combining circuit 14 in this case cannot take the form of a linear adder as was true in the previously described example, but can instead take the form of a simple signal coupler, such as the conventional center tapped transformer shown in FIG. 7, for example. The resultant signal developed across the secondary of the transformer will be of the same form as that developed at the output of the adder of FIG. 6 in the previously described example, namely that shown in equation (9) above.

DESCRIPTION OF THE APPARATUS OF FIG. 2

Figure 2:
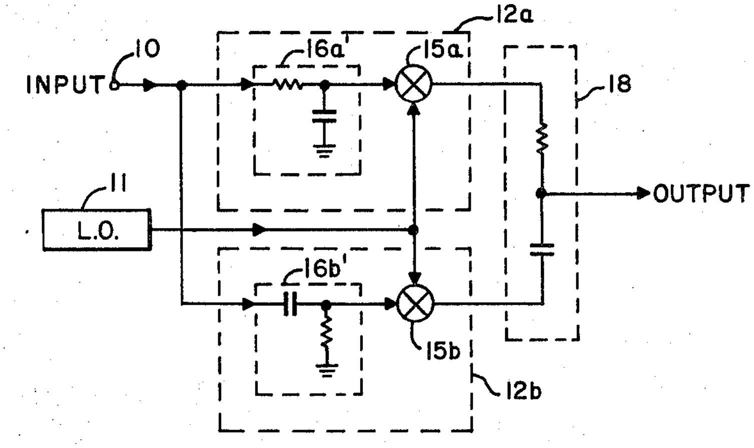
FIG. 2 is a schematic diagram of another form of electronic image rejection apparatus embodying the invention.

In FIG. 2 of the drawing there is shown another embodiment of the invention which differs somewhat from that of FIG. 1. Elements in FIG. 2 which are identical with corresponding elements of FIG. 1 that have previously been described, have been given identical reference numbers and will not be described further.

The embodiment of FIG. 2 differs from that of FIG. 1 in that in the FIG. 2 apparatus the *L.O.* signal is coupled directly to inputs of the mixers 15*a* and 15*b*, while the input signal is phase shifted by −45° and +45° in phase-shifting circuits 16*a'* and 16*b'* respectively, which in this case are simple R-C networks. This arrangement may be used where attenuation of the input signal due to phase shifting is not of concern, and where operation over a wider range of input signal frequencies is desired.

It will be appreciated that regardless of whether it is the *L.O.* signal which is phase shifted as in FIG. 1 or the input signal which is phase shifted as in FIG. 2, the first and second signals developed by mixers 15*a* and 15*b* will be of substantially the same form (that shown in equations (5) and (6) above, assuming $\omega_i>\omega_L>\omega_s$, for example) in either case.

The embodiment of FIG. 2 further differs from that of FIG. 1 in that the circuitry is simplified by utilizing a single series R-C circuit 18 to perform the phase shifting and combining functions of the units 13 and 14 in the FIG. 1 embodiment. This can be done by selecting suitable mixers for 15*a* and 15*b* which have low output impedances, and by insuring that the output of R-C circuit 18 is coupled to a subsequent stage which has a high input impedance. Where these latter two simple conditions are met in the FIG. 2 embodiment, then the first signal appearing at the output of mixer 15*a* will effectively be applied to an R-C circuit equivalent to that shown used in phase-shifting circuit 16*a'*. Similarly, the second signal appearing at the output of mixer 15*b* will effectively be applied to an R-C circuit equivalent to that shown used in phase-shifting circuit 16*b'*. The output signal in both cases is developed at the juncture between the resistor and capacitor of the R-C circuit 18.

Although the electronic image rejection apparatus of FIG. 2 differs physically from that of FIG. 1, the functional operation of the FIG. 2 apparatus is virtually identical to that of FIG. 1, and therefore, no further discussion of the operation of the embodiment of FIG. 2 is deemed necessary.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

I claim:

1. Electronic image rejection apparatus usable to provide relatively uniform image rejection performance over a band of input frequencies and a range of operating temperatures without supplemental frequency or temperature compensation, comprising:

means for supplying an input signal having desired components in a first frequency band and which may have undesired image components in said frequency band;

means for supplying a reference signal of predetermined frequency; first signal translating means, responsive jointly to said input and reference signals and including a first phase-shifting circuit for introducing a phase shift of substantially −45° and a first mixer, for developing at the output of said mixer a first signal having desired and image components, corresponding to like components of said input signal, in a second frequency band with the desired components of said first signal exhibiting a phase shift which is substantially equal and opposite to a phase shift exhibited by the image components of said first signal;

second signal translating means, responsive jointly to said input and reference signals and including a second phase-shifting circuit for introducing a phase shift of substantially +45° and a second mixer, for developing at the output of said mixer a second signal having desired and image components, corresponding to like components of said input signal, in said second frequency band with the desired components of said second signal exhibiting a phase shift which is substantially equal and opposite both to a phase shift exhibited by the image components of said second signal and to the phase shift exhibited by the desired components of said first signal;

and a series combination of a resistor and a capacitor connected between the outputs of said first and second mixers for phase shifting said first and second signals by substantially equal and opposite amounts and for combining said phase-shifted first and second signals to develop at the junction of said resistor and capacitor, a resultant signal consisting of the additive combination of said phase-shifted first and second signals and containing substantially no image components;

whereby different input frequencies and different operating temperatures have complementary effects on said first and second signals translating means and on said resistor-capacitor combination, thereby permitting the image rejection performance of said apparatus to remain relatively uniform over said band on input frequencies and said range of operating temperatures.

2. Apparatus in accordance with claim 1, wherein said reference signal is coupled directly to an input of said first and second mixers and wherein said input signal is coupled through said first phase-shifting circuit to another input of said first mixer and is also coupled through said second phase-shifting circuit to another input of said second mixer.

3. Apparatus in accordance with claim 1, wherein said input signal is coupled directly to an input of said first and second mixers and wherein said reference second signal is coupled through said first phase-shifting circuit to another input of said first mixer and is also coupled through said second phase-sifting circuit to another input of said second mixer.

4. Apparatus in accordance with claim 3 wherein the frequency of said reference signal is greater than the frequency of the desired components of said input signal, wherein said first signal translating means develops a first signal having desired components which exhibit a phase shift of substantially +45° and image components which exhibit a phase shift of substantially −45°, and wherein said second signal translating means develops a second signal having desired components which exhibit a phase shift of substantially −45° and image components which exhibit a phase shift of substantially +45°, and wherein said resistor-capacitor combination phase shifts the desired and image components of said first signal by substantially −45° and phase shifts the desired image components of said second signal by substantially +45°, thereby developing said resultant signal at the junction of said resistor and capacitor.